3,772,440
METHOD FOR THE TREATMENT OF
PARKINSONISM AND DEPRESSION
M Krishna Menon, Van Nuys, Calif., assignor to Astra Lakemedel Aktiebolag, Sodertalje, Sweden
Filed Jan. 7, 1972, Ser. No. 216,199
Int. Cl. A61k 27/00
U.S. Cl. 424—273                         3 Claims

ABSTRACT OF THE DISCLOSURE

Pharmaceutical compositions containing 2(p-nitrobenzylthio)-imidazoline or a therapeutically acceptable salt thereof and a method for treating of parkinsonism and depression by using the same, are described.

---

Figure 1:
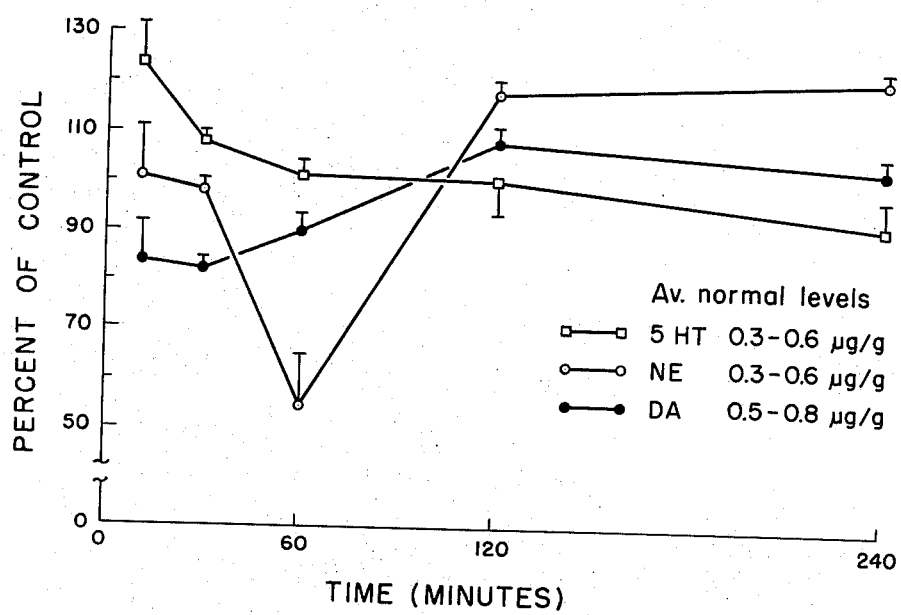

The present invention relates to pharmaceutical compositions and a method for the treatment of certain neurological disorders in humans. More particularly, the invention relates to a method of alleviating the symptoms of rigidity, akinesia and tremor in patients suffering from Parkinson's disease, which method comprises administration to a host suffering from such disease a therapeutically effective amount of a compound of the formula

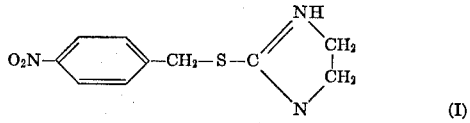

or a therapeutically acceptable salt thereof. The hydrochloride salt of this compound, 2(p-nitrobenzylthio)-imidazoline (3H)·HCl, which is used in the biological tests, is herebelow denoted NBTI.

Parkinson's disease, or parkinsonism, is considered to be a chronic neurological disorder and is characterized i.a. by tremor, rigidity of the limbs, hypokinesia, or abnormally decreased mobility, and akinesia, or abnormal absence or poverty of movements.

The pathophysiology of parkinsonism in man can, at least partly, be explained with a degeneration in the dopaminergic system in the brain, localized to nucleus caudatus, putamen and substantia nigra. These parts of the brain contain in normal human subjects about 80 percent of the total amount of dopamine in the brain. In patients suffering from parkinsonism depletion of dopamine,

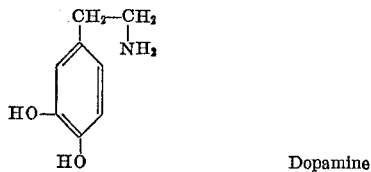
Dopamine in the brain is observed. One rational method for treatment of parkinsonism therefore consists of administering to the patient of L-dopa, the L-form of the compound of the formula

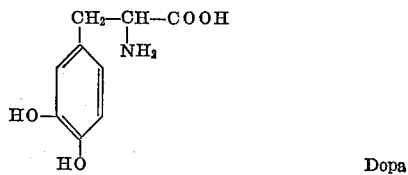
Dopa a precursor of dopamine, which substance does pass the blood-brain barrier and is decarboxylated in the brain under formation of dopamine.

The development of L-dopa in the treatment of parkinsonism has made this and some related diseases more amendable to drug treatment and is proving to be far more effective than with the anticholinergic agents. However, many patients are refractory to L-dopa treatment. Even in those who respond favorably to L-dopa, side effects occur, such as, gastrointestinal disturbances, cardiovascular effects, psychic changes, and most of all, a chorioform hyperkinesis, in about 30% of the cases, have been reported.

Another method for treatment of parkinsonism which has been tested consists of administration of apomorphine,

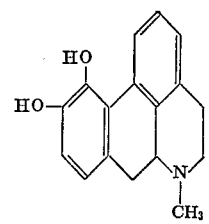
Apomorphine

Apomorphine is a dopaminergic agent which has been tested as an agent for treatment of parkinsonism, see Cotzias et al., The New England Journal of Medicine, 282, 31–33 (1970). Apomorphine has been found to have an alleviating effect on akinesia and rigidity occurring in connection with Parkinson's disease but its severe drawbacks, mainly the short duration of its desired therapeutic effect and its emetic effect, render the therapeutical use of apomorphine for treatment of parkinsonism practically impossible.

One object of the present invention is to provide a therapeutically acceptable method of treating parkinsonism in man using a dopaminergic agent which has a long-lasting effect on alleviating rigidity, akinesia and tremor occuring in connection with Parkinson's disease but without exhibiting the drawbacks of L-dopa and apomorphine.

Another object of the present invention is to provide a therapeutically acceptable method of treating depression in man.

Still another object of the invention is to provide pharmaceutical compositions useful in the treatment of parkinsonism and depression. These and other objects are achieved by using the compound 2-(p-nitrobenzylthio)-imidazoline, with the structural formula

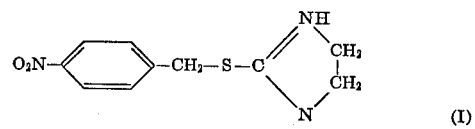

or a therapeutically acceptable salt thereof. The synthesis of the compound of the Formula I is described by Easton et al. (Easton, N. R., A. Hlynsky, and H. Foster, 1951, Reactions of Ethylen Thiourea, J. Amer. Chem. Soc., 73, 3507.)

Any earlier proposed therapeutic activity on the central nerve system of the compound of the Formula I is however not known.

It has now surprisingly been found that the compound of the Formula I is a powerful dopaminergic agent which can be used to alleviate the symptoms of rigidity, akinesia and tremor in patients suffering from Parkinson's disease. This antiparkinson effect has been observed in different animal experiments and those animal (inter alia monkeys) experiments have as yet failed to reveal for the compound of the Formula I any of the above mentioned drawbacks of L-dopa and apomorphine.

BIOLOGICAL TESTS

Male albino rats (Sprague-Dawley, 150–210 grams) and male Swiss mice (20–32 grams) were used in all the experiments and the drugs were administered intraperitoneally (I.P). Experiments were performed at a room temperature of 23±1° C. Control experiments were always performed simultaneously with solvent-treated animals.

(a) Brain neurohormonal changes (I)

NBTI (50 mg./kg. bodyweight) was administered to groups of mice and were sacrificed at various time intervals (FIG. 1) and the whole brain NE(norepinephrine:2-amino-1-(3,4-dihydroxyphenyl)ethanol), DA(dopamine) and 5 HT(serotonin:3 - (2 - aminoethyl)-5-indolol) were estimated according to the single extraktion procedure, described by Fleming et al. (Fleming, R. M., W. G. Clark, E. D. Fenster, and J. C. Towne, 1965, Single Extraction Method for the Simultaneous Fluorometric Determination of Serotonin, Dopamine, and Norepinephrine in Brain, Analyt. Chem. 37, 692).

The results are shown in FIG. 1. The only significant change in the brain neurohormones was a depletion of NE in rats and mice. In the whole brain of mouse, the NE level at 1 hour after drug was 54.8% of control, but at 2 hours, the NE level was normal. The 5HT level showed a slight elevation at 10 minutes (FIG. 1).

(b) Brain neurohormonal changes (II)

In order to study the influence of NBTI on the turnover rates of NE, DA and 5HT, diffrent groups of mice, 5 per group, pretreated with 50 mg./kg. dose of NBTI were treated 15 minutes later by the tryrosine hydroxylase inhibitor αMT (250 mg./kg. base) or the tryptophan hydroxylase inhibitor (H 22/54, 500 mg./kg.) and were sacrificed 2 or 4 hours after the second injection. The NE and DA contents of whole brain in αMT-treated animals and 5HT content of H 22/54 treated ones were estimated as before, and were compared with the amine changes caused by the enzyme inhibitors in saline pretreated mice.

The above mentioned inhibitors αMT and H 22/54 denote α-methyltyrosine methylester hydrochloride and α-propyl-3,4-dihydroxyphenylacetamide, respectively.

The results are given in Table 1. It may be seen that pretreatment of mice with this drug decelerated the depletion of both NE and DA caused by αMT. Similar effects were produced NBTI on the H 22/54 induced 5HT depletion, but the results were not significant.

TABLE 1.—EFFECT OF NBTI PRETREATMENT ON αMT METHYL ESTER INDUCED DEPLETION OF CATECHOLAMINES IN THE WHOLE BRAIN OF MICE

| Drug and dose | Time of sacrifice | Amine content of whole brain | | |
|---|---|---|---|---|
| | | DA | NE | 5HT |
| | | Percent of control | | |
| NBTI, 50/mg./kg. | 2 hours 15 minutes | 108.9±25.7 | 118.1±6.3 | |
| αMT, 250 mg./kg. | 2 hours | 82.0±16.8 | 94.6±2.0 | |
| NBTI plus αMT | do | 91.6±16.1 | 98.4±11.3 | |
| NBTI, 50 mg./kg. | 4 hours 15 minutes | 106.5±5.6 | 123.3±7.9 | |
| αMT, 250 mg./kg. | 4 hours | 38.6±2.2 | 63.9±2.2 | |
| NBTI plus αMT | do | 54.1±1.6 | 78.2±16.1 | |
| NBTI, 50 mg./kg. | 4 hours 15 minutes | | | 89.6±4.1 |
| H 22/54, 500 mg./kg. | 4 hours | | | 53.7±6.9 |
| NBTI plus H, 22/54 | do | | | 62.2±10.0 |

NOTES:
1. Each value is the mean of 5–7 estimations.
2. αMT and H 22/54 was administered 15 min. after NBTI.
3. Percentage was calculated from control values obtained from experiments (4 rats) run simultaneously with each set.

(c) Effect of NBTI on behavioral depression and akinesia in rats treated with reserpine and αMT Thirty rates were used for this experiment. Their normal exploratory behavior was measured for 4 consecutive days by leaving them in the center of an enclosed, open field consisting of 25 cm. squares and the number of squares each animal traversed during a 3-minute test period was noted. On the fourth day, the animals were treated with reserpine (cf. The Merck Index, eighth edition, p. 912) (5 mg./kg.) and 24 hours later by αMT (250 mg./kg.). Four hours after αMT, the animals were tested in the open field and then 10 rats were given saline and the rest were treated with NBTI (30 mg./kg.). Five of the controls and 10 test animals were tested in the open field 10 minutes after NBTI treatment and the rest were tested 30 minutes afterwards. All the animals were again tested at 60 minutes.

Figure 2:
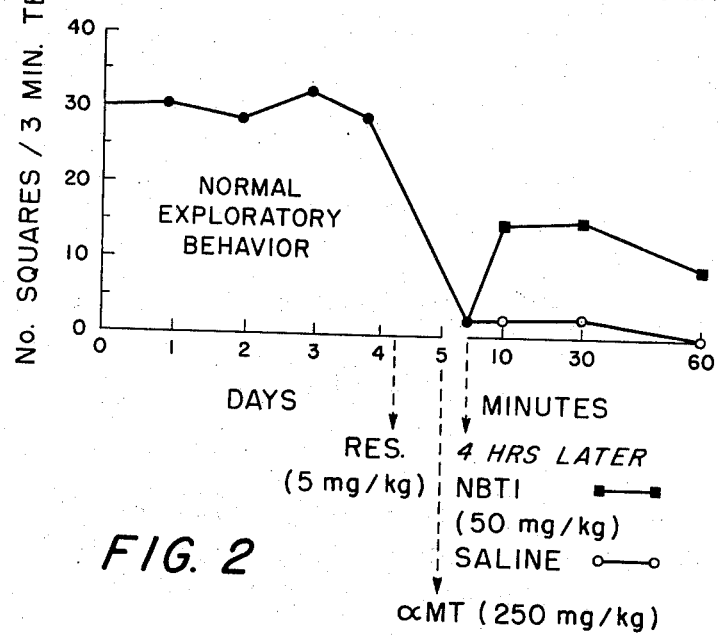

The results are shown in FIG. 2. It may be seen that treatment of rats with a combination of reserpine and αMT caused almost complete loss of locomotor activity and their exploratory activity almost completely ceased. NBTI caused dramatic change in the behaviour of these animals. Within 3 minutes after the 30 mg./kg. dose of this drug, the animals started moving about in the cage, had mild tremors and showed marked stereotyped movements. When left in the open field, they showed greatly enhanced exploratory behavior, moved about with near-normal gait, the mild tremors making the movements occasionally jerky. In fact, the antagonism was more complete and much more impressive than seen in FIG. 2, the persistent stereotyped movements preventing the animals from showing their normal exploratory pattern. It is possible that a lower dose of NBTI would antagonize the depressant effects of reserpine and αMT without causing any over-stimulation.

(d) Studies on monkeys (I)

Studies have been performed to evaluate NBTI on Rhesus monkeys with special reference to its antiparkinsonism effects. A preliminary study was made in one animal (adult female, 5 kg., health-conditioned for over 2 years and not used before).

It was caged alone and was observed frequently for over two days for its normal behavioral patterns and reactions to the presence of humans. Single doses of the drug, 10, 20, 30 and 60 mg./kg., intramuscularly (I.M.), in saline, sterilized by Millipore® (i.e., a special filter described in Modern Microbiology, W.W. Umbreit, p. 53 [1962]), were given, 7–10 day intervals lapsing between each injection, and after each dose, the animal was observed by three independent observers.

On the whole, the behavioral effects on NBTI on the monkey paralleled closely to those seen in rats and mice. A 10 mg./kg. dose of the drug failed to alter the behavior of the animal. In a dose of 20 mg./kg., mild, intermittent whole body tremors were observed 10 minutes after drug treatment and lasted for 40–50 minutes. Neither hyperactivity nor increased aggression was observed during this period. One hour after drug treatment, the animal appeared to be less aggressive and seemed to be less disturbed by sounds and the presence of observers.

In a dose of 30 mg./kg., the whole body tremors were more pronounced than with the lower dose, were continuous during the first 15–20 minutes, but later became mild and intermittent. The animal seemed to be hyperactive during the initial 15–20 minutes. Five minutes after injection, the monkey also started showing peculiar stereotyped movements which lasted for more than 90 minutes. The animal would life up its right foot and would pick at the bottom of that foot with the left thumb and forefinger, this being done 2-3 times a minute. It gave the appearance of trying to remove an object sticking to the foot because many times the hand would go immediately to the mouth as if to chew a non-existent object from her foot. The animal seemed to be somewhat transquilized for 45 minutes.

The 60 mg./kg. dose proved to be too high for the animal. Severe whole body tremors started within 3 minutes followed by running fits and one episode of severe clonic convulsions. Within a minute, the animal recovered then started showing the peculiar stereotyped behavior mentioned before. The animal looked calm and transquilized after 40-45 minutes. When observed 18 hours later, the animal looked normal in all respects.

Even the highest dose test was not emetic.

(e) Studies on monkeys (II)

Two weeks after the above series, the animal was treated with reserpine (5 mg./kg., I.M.), followed 24 hours by αMT (100 mg./kg., I.M.). Four hours after this, the animal was observed for 1 hour and then given NBTI (15 mg./kg., I.M.), and the behavioral changes closely observed for 3 hours and then at 24 and 48 hours. All observations were supplemented by photographs and cinematography.

Treatment of the monkey with a combination of reserpine and αMT made the animal extremely inactive. Four hours after αMT, it remained in the corner of the cage with a typical hunched back posture and showed marked sedation, tremors and oral dyskinesia. The animal could be aroused or made to move only by pushing it firmly. It would not accept food from the experimenter. In this animal, NBTI produced a most impressive effect. Within 3 minutes after a 15 mg./kg. dose, the animal started walking around, its facial expression and eyes became absolutely normal. At times it jumped to the top of the cage and behaved as it did before the reserpine treatment. Food was readily accepted and a portion of it was eaten. The animal had mild tremors during the initial 4-5 minutes. During the stimulant phase, the animal was very docile and permitted the experimenters to handle it at will. All these effects lasted for 30-40 minutes after which the animal returned to the original reserpine-αMT depressive state.

(f) Studies on the antidepresant effects of NBTI

It is now well established that the classical tricyclic antidepresants exert part of their effect by blocking the reuptake of NE by nerve terminals. An in vitro study showed that NBTI is about 100 times more effective than desipramine (cf. The Merck Index, eighth edition, p. 331) in blocking the uptake of NE by slices of rat hypothalamus. This indicates that NBTI possess an antidepressant effect as well.

(g) Acute toxicity

Preliminary acute toxicity studies showed that in mice the $LD_{50}$ of NBTI is 155 mg./kg.

EVALUATION OF THE BIOLOGICAL TESTS

The pharmacological and biochemical studies indicate that NBTI causes direct stimulant effect of central DA receptors. This was supported by the observation that this drug readily and effectively reversed the sedation and alkinesia caused in rats by combined treatment with reserpine and αMT. Similar striking effects were observed in the Rhesus monkey. These findings together with its effect on the uptake of catecholamines indicates its usefulness as an antiparkinsonism and/or antidepressant drug.

Experiments performed on rats and a monkey in which complete depletion of brain DA was effected by the administration of reserpine and αMT, showed that NBTI could effectively antagonize their depression and akinesia. The effect of NBTI on the monkey closely parallels that shown by L-dopa in reversing the catatonia induced by αMT in monkeys (cf. Bedard, P., L. Larochelle, L. J. Poirier, and T. L. Sourkes, 1970, Reversible Effect of L-Dopa on tremor and Catatonia Induced by α-Methyl-p-Tyrosine, Canad. J. Physiol. Pharmacol., 48, 82.). In our studies, this remarkable effect of NBTI on the monkey was produced without any emetic response, which is worth mentioning because apomorphine, a DA receptor stimulant drug, though found to be useful in the treatment of parkinsonism has great limitations because of its powerful emetic effect which makes practical therapy impossible.

L-dopa causes a variety of peripheral effects in animals including piloerection and exopthalmos. A number of undesirable effects are also seen in patients with Parkinson's disease treated with L-dopa. The results from the biological tests indicate that the side effects of NBTI could be minimal in patients.

In clinical practice the compound NBTI will normally be administered orally or parenterally in the form of pharmaceutical preparations comprising the active ingredient in the form of the free base or a pharmaceutically acceptable salt thereof, e.g. the hydrochloride in association with a pharmaceutically acceptable carrier which may be a solid, semi-solid or liquid diluent or an ingestible capsule, and such preparations comprise a further aspect of the invention. Usually, the active substance will comprise between about 0.1 and about 95% by weight of the preparation, for example, between 0.5 and 20% for preparations intended for injection and between 0.1 and 50% for preparations intended for oral administration.

To produce pharmaceutical preparations in the form of dosage units for oral application containing a compound of the invention in the form of the free base, or a pharmaceutically acceptable salt thereof, the active ingredient may be mixed with a solid, pulverulent carrier, for example lactose, saccharose, sorbitol, mannitol, a starch such as potato starch, corn starch, amylopectin, laminaria powder or citrus pulp powder, a cellulose derivative or gelatin, and also may include lubricants such as magnesium or calcium stearate or a Carbowax® (i.e., a wax composed of polyethyleneglycols, see Römpp: Chemielexikon) or other polyethylene glycol wax and compressed to form tablets or centres for dragees. If dragees are required, the centres may be coated, for example with concentrated sugar solutions which may contain gum arabic, talc and/or titanium dioxide or alternatively with a lacquer dissolved in easily volatile organic solvents or mixtures of organic solvents. Dyestuffs can be added to these coatings, for example, to distinguish between different contents of active substance. For the preparation of soft gelatin capsules (pearl-shaped closed capsules) consisting of gelatin and, for example, glycerin, or similar closed capsules, the active substance may be admixed with a Carbowax®. Hard gelatin capsules may contain granulates of the active substance with solid, pulverulent carriers such as lactose, saccharose, sorbitol, mannitol, starches (for example potato starch, corn starch or amylopectin), cellulose derivatives or gelatin, and may also include magnesium stearate or stearic acid. Dosage units for rectal application may be in the form of suppositories comprising the active substance in admixture with a neutral fatty base, or gelatin rectal capsules comprising the active substance in admixture with a Carbowax® or other polyethylene glycol wax.

Liquid preparations for oral application may be in the form of syrups or suspensions, for example solutions containing from about 0.1% to 20% by weight of active substance, sugar and a mixture of ethanol, water, glycerine, propyleneglycol and, optionally, aroma, saccharine and/or carboxymethylcellulose as a dispersing agent.

For parenteral application by injection preparations may comprise an aqueous solution of a water soluble pharmaceutically acceptable salt of the active substance desirably in a concentration of 0.5–10% by weight and optionally also a stabilizing agent and/or buffer substance in aqueous solution. Dosage units of the solution may advantageously be enclosed in ampoules.

The following examples illustrate how the compound NBTI can be incorporated in pharmaceutical compositions.

EXAMPLE 1

Preparation of soft gelatin capsules 500 g. of active substance were mixed with 500 g. of corn oil whereafter the mixture was filled in soft gelatin capsules each capsule containing 100 mg. of mixture (i.e. 50 mg. of active substance).

EXAMPLE 2

Preparation of soft gelatin capsules 500 g. of active substance were mixed with 750 g. of peanut oil whereafter the mixture was filled in soft gelatin capsules, each capsule containing 125 mg. of mixture (i.e. 50 mg. of active substance).

EXAMPLE 3

Preparation of tablets 50 g. of active substance were mixed with 20 kg. of silicon dioxide of the trade mark Aerosil, whereafter 45 kg. of potato starch and 50 kg. of lactose were mixed in and the mixture moistened with a starch paste prepared from 5 kg. of potato starch and distilled water, whereafter the mixture was granulated through a sieve. The granulate was dried and sieved whereafter 2 kg. of magnesium stearate were mixed in. Finally, the mixture was pressed into tablets, each weighing 172 mg.

EXAMPLE 4

Preparation of an emulsion 100 g. of active substance were dissolved in 2500 g. of peanut oil. From the solution thus obtained, 90 g. of gum arabic, aroma and colour (q.s.) and 2500 g. of water an emulsion was prepared.

EXAMPLE 5

Preparation of a syrup 100 g. of active substance were dissolved in 300 g. of 95% ethanol where 300 g. of glycerol, aroma and colour (q.s.) and water 1000 ml. were mixed in. A syrup was thus obtained.

EXAMPLE 6

Preparation of a solution 100 g. of active substance were dissolved in 2000 g. of polyoxyethylene sorbitan monooleate, whereafter aroma and colour (q.s.) and water 5000 ml. were mixed in. A drop solution was thus obtained.

EXAMPLE 7

Preparation of effervescent tablets 100 g. of active substance, 140 g. of finely divided citric acid, 110 g. of finely divided sodium hydrogen carbonate, 3.5 g. of magnesium stearate and aroma (q.s.) were mixed and the mixture was pressed into tablets, each containing 100 mg. of active substance.

EXAMPLE 8

Preparation of a sustained release tablet 200 g. of active substance were melted together with 50 g. of stearic acid and 50 g. of carnauba wax. The mixture thus obtained was cooled and ground to a particle size of at most 1 mm. (diameter). The mass thus obtained was mixed with 5 g. of magnesium stearate and pressed into tablets each weighing 305 mg. Each tablet thus contains 200 mg. of active substance.

From the biological test it is apparent that there is no need for dosage units containing more than 5 g. of the active substance.

What we claim is:

1. A method for treating parkinsonism which comprises administering to a host suffering from such disease an effective amount of 2(p-nitrobenzylthio)-imidazoline or a therapeutically acceptable salt thereof.

2. A method for alleviating symptoms of rigidity, akinesia, hypokinesia and tremor, which comprises administering to a host suffering from such symptoms an effective amount of 2(p-nitrobenzylthio)-imidazoline or a therapeutically acceptable salt thereof.

3. A method for treating depression which comprises administering to a host suffering from such disease an effective amount of 2(p-nitrobenzylthio)-imidazoline or a therapeutically acceptable salt thereof.

References Cited

Chem. Abst. 67, 107246V (1967).
Chem. Abst. 67, Subj. Index A–I, p. 1772S.
Chem. Abst., vol. 46, 2538–2539 (1952).

STANLEY I. FRIEDMAN, Primary Examiner

PO-1050
(5/69)

UNITED STATES PATENT OFFICE
CERTIFICATE OF CORRECTION

Patent No. 3,772,440                    Dated November 13, 1973

Inventor(s) M. K. Menon

It is certified that error appears in the above-identified patent
and that said Letters Patent are hereby corrected as shown below:

Col. 1, lines 25-30 and Col. 2, lines 50-54, in the formula, change

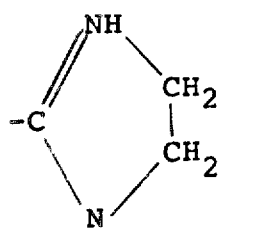    to    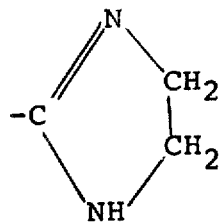  .

Col. 3, line 31, change "diffrent" to -- different --;

Col. 3, line 47, change "produced NBTI" to -- produced by NBTI --;

Col. 5, lines 9 and 16, change "transquilized" to -- tranquilized --.

Signed and sealed this 23rd day of April 1974.

(SEAL)
Attest:

EDWARD M.FLETCHER,JR.
Attesting Officer

C. MARSHALL DANN
Commissioner of Patents